(12) United States Patent
Boggavarapu et al.

(10) Patent No.: US 11,606,480 B2
(45) Date of Patent: *Mar. 14, 2023

(54) METHOD AND SYSTEM FOR AUTOMATICALLY SYNCHRONIZING AUDIO-VIDEO INPUTS IN A MULTI-CAMERA ENVIRONMENT

(71) Applicant: DISH NETWORK TECHNOLOGIES INDIA PRIVATE LIMITED, Bengalore (IN)

(72) Inventors: Abhiroop Boggavarapu, Bangalore (IN); Dalimba Laxminarayana, Bangalore (IN); Rao Venkata Krishna Suryanarayana, Bangalore (IN); Satish Balasubramanian Iyer, Bangalore (IN)

(73) Assignee: DISH NETWORK TECHNOLOGIES INDIA PRIVATE LIMITED, Bengalore (IN)

( * ) Notice: Subject to any disclaimer, the term of this patent is extended or adjusted under 35 U.S.C. 154(b) by 64 days.

This patent is subject to a terminal disclaimer.

(21) Appl. No.: 17/314,920

(22) Filed: May 7, 2021

(65) Prior Publication Data

US 2021/0337087 A1    Oct. 28, 2021

Related U.S. Application Data

(63) Continuation of application No. 16/504,992, filed on Jul. 8, 2019, now Pat. No. 11,032,447.

(51) Int. Cl.
*H04N 5/04*    (2006.01)
*H04N 5/38*    (2006.01)
(Continued)

(52) U.S. Cl.
CPC ............... *H04N 5/04* (2013.01); *G06T 7/80* (2017.01); *G06T 7/97* (2017.01); *H04N 5/38* (2013.01)

(58) Field of Classification Search
CPC ........ H04N 5/06; H04N 5/067; H04N 5/0733; H04N 2013/0096; H04N 13/167;
(Continued)

(56) References Cited

U.S. PATENT DOCUMENTS

2006/0125920 A1    6/2006  Criminisi et al.
2008/0138032 A1    6/2008  Leyendecker et al.
(Continued)

FOREIGN PATENT DOCUMENTS

CN    102169664 A    8/2011
JP    2016-116107 A    6/2016
WO    2018/177105 A1    10/2018

*Primary Examiner* — Brian P Yenke
*Assistant Examiner* — Humam M Satti
(74) *Attorney, Agent, or Firm* — Seed IP Law Group LLP

(57) ABSTRACT

Systems and methods for synchronizing video generated by a camera with media content generated by a media source external to the camera. A calibration procedure is performed in which a time delay is determined that includes a camera delay associated with the camera. A display device displays a sequence of images comprising a first image displayed for a first time period and a second image displayed for a second time period. The camera captures a plurality of captured images capturing display of the sequence of images and a transmitter device coupled to the camera transmits the captured images to a hub. The hub determines a target image of the captured images corresponding to display of the second image. The time delay is determined based on a difference between a time associated with the target image and a time associated with the second image.

20 Claims, 6 Drawing Sheets

(51) Int. Cl.
*G06T 7/00* (2017.01)
*G06T 7/80* (2017.01)

(58) Field of Classification Search
CPC ............... H04N 13/296; H04N 13/398; H04N 21/4302; H04N 21/4307; H04N 21/43072; H04N 21/43076; H04N 21/43078; H04N 21/43079; H04N 21/8547; H04N 5/04; H04N 5/38; H04N 21/2743; H04N 21/4788; H04N 21/816; G06T 7/80; G06T 7/85; G06T 7/97; G11B 27/28

See application file for complete search history.

(56) References Cited

U.S. PATENT DOCUMENTS

| | | |
|---|---|---|
| 2012/0019633 A1 | 1/2012 | Holley |
| 2012/0044358 A1 | 2/2012 | Thomason et al. |
| 2012/0098980 A1 | 4/2012 | Takahashi et al. |
| 2013/0278779 A1 | 10/2013 | Hong |
| 2015/0194128 A1 | 7/2015 | Hicok |
| 2017/0111565 A1* | 4/2017 | Shibahara ............ H04N 21/242 |
| 2017/0195669 A1 | 7/2017 | Jokinen et al. |
| 2017/0359612 A1 | 12/2017 | Kuplevakhsky |
| 2018/0091704 A1 | 3/2018 | Koyama et al. |
| 2019/0199890 A1* | 6/2019 | Saito ................ H04N 5/232061 |
| 2020/0280761 A1* | 9/2020 | Staples .................. G06T 7/246 |

* cited by examiner

METHOD AND SYSTEM FOR AUTOMATICALLY SYNCHRONIZING AUDIO-VIDEO INPUTS IN A MULTI-CAMERA ENVIRONMENT

CROSS-REFERENCE TO RELATED APPLICATION

This application is a continuation application of U.S. patent application Ser. No. 16/504,992, filed Jul. 8, 2019, now U.S. Pat. No. 11,032,447, which is incorporated herein by reference.

BACKGROUND

Technical Field

The present disclosure relates to video capture systems and, more particularly, to synchronization of media content provided by separate sources.

Description of the Related Art

The proliferation of media content presentation in recent years is due at least in part to the rise in popularity of certain media presentation platforms, such as YouTube® and Facebook®. With this proliferation, technology has been developed that enables users to capture, upload, and broadcast audio and video content. In some instances, users may wish to capture multiple sources of media content at the same time. For example, a user may wish to capture video from two or more cameras at the same time, or capture video from a camera and audio from a microphone external to the camera.

Each of the media sources may process capture of the media content differently, which can cause different timings for different media sources. It may take a certain amount of time for a camera (e.g., SLR, camcorder, iOS/Android device) to capture, process, and output video images whereas it may take a different amount of time for another media source, such as an external microphone or another camera, to capture, process, and output media content. In such multi-source environments, a skew or offset between different media sources, such as a difference in timing between audio and video captured of a subject, may be distracting to the viewer and may decrease overall enjoyment. Currently, users of such systems have to synchronize the media captured to account for the different time delays of these different media sources to facilitate coherent presentation of the subject matter captured. This synchronization process can be a difficult and time-consuming challenge for many users, which may require the use of additional equipment and/or additional software to accomplish in post-processing. The user may, for instance, use additional software to manually synchronize the audio content with the video content during playback after the media content has been captured.

BRIEF SUMMARY

The technologies disclosed herein include systems, and operating methods thereof, for synchronizing video captured by a camera with media content from media sources external to the camera. Synchronization is based on a time delay determined as part of a calibration procedure that includes displaying, by a display device, a sequence of images that includes display of a first image for a first time period and a second image for a second time period shorter than the first time period. A hub receives display time information generated by the display device indicating a time at which the second image was displayed. A transmitter device is communicatively coupled to a video output port of the camera and an aperture of the camera is directed at a display of the display device during the first time period and the second time period. The camera generates a plurality of captured images capturing display of the first and second images. The plurality of captured images are provided to the hub along with capture time information indicating times at which the captured images were outputted by the camera or captured by the transmitter.

The hub determines a target image of the captured images that captures display of the second image by the display device. The hub then identifies a second time at which the target image was displayed. The hub can then determine a time delay associated with the camera based on a difference between the first time and the second time. The time delay may also include a capture time delay associated with the transmitter. Using the time delay determined, video generated by the camera and transmitted by the transmitter device may be synchronized with media content generated by external sources, such as audio provided by a microphone external to the camera or video provided by a second camera. Beneficially, this calibration procedure facilitates synchronization without post-processing procedures, which could involve additional software and user experience to perform. Moreover, the calibration procedure can be used in a wireless network in various environments and lighting conditions. Further, the procedure is easy to implement, noise tolerant, and independent of variable network delays and video buffering.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is comprised. For instance, a subset of a set of ten items will have less than ten items and at least one item.

Figure 1:
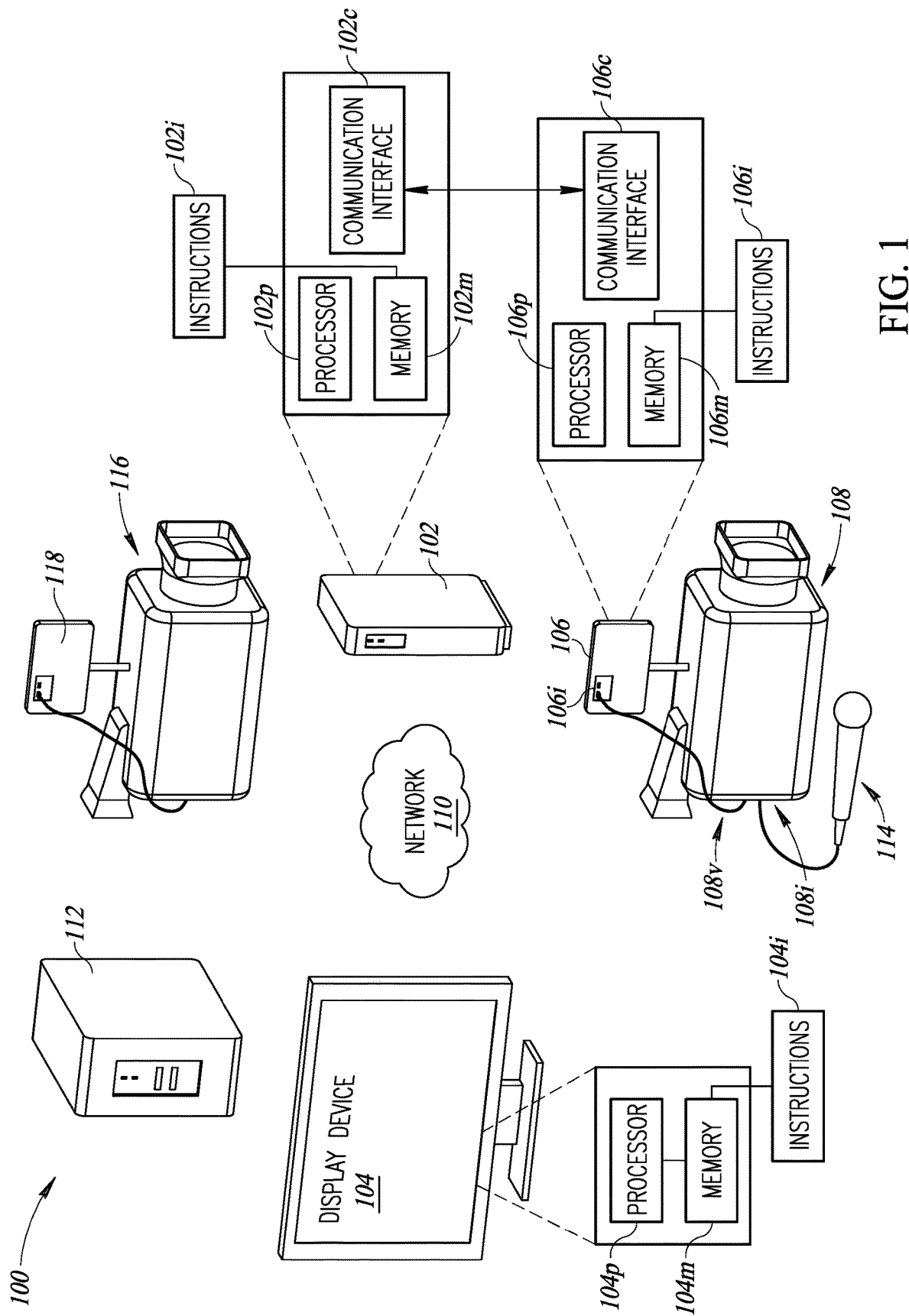
FIG. 1 shows an environment in which a system performs a calibration procedure according to one or more embodiments.

FIG. 1 shows an environment 100 in which a system performs a calibration procedure according to one or more embodiments. The environment 100 includes a hub 102, a display device 104, a transmitter device 106, and a camera 108. The environment 100 may include one or more networks 110 over which data can be transferred to communicatively link devices of the environment 100. The environment 100 may further include one or more computer systems 112 communicatively coupled via the one or more networks 110 to various components in the environment 100. The one or more networks 110 may include one or more local area networks (LANs), one or more wide area networks (WANs), mesh networks, Wi-Fi networks, cellular networks, and the like, which communicatively link various processor-based devices discussed herein. The one or more computer systems 112 may include servers and/or data storage (e.g., database) that perform operations (e.g., storing, accessing, editing, transmitting, streaming, receiving) involving media content data (e.g., video data, audio data, image data) in the environment 100. For instance, a computer system 112 may receive and store video data from the hub 102, and selectively stream the video data to the display device 104 for viewing by a user.

The hub 102 is a platform that processes and facilitates the transfer of video data between various components in the environment 100. For instance, the hub 102 may receive and process video data generated by the camera 108 and broadcast the video data to the display device 104 for viewing. As another example, the hub 102 may transmit video data generated by the camera 108 to the computer system 112 for remotely storing data. The hub 102 may also process video generated by the camera 108 and synchronize the video with media content from media sources external to the camera 108. To synchronize video content from the camera 108 with media content from external sources, a calibration procedure may be performed in which the hub 102 determines a time delay associated with one or more media content sources in the environment 100, as described below in further detail.

The term "synchronize," as used herein, refers to a procedure that correlates the playback timing of media content from two or more sources to match or coincide with a time at which the two or more sources captured the media content in real time. For example, synchronization refers to a process by which video captured by a camera and audio content captured by an external microphone are correlated such that playback of the video content and the audio content coincide in time to present an event as a person would experience it in real-time. As another example, a first camera and a second camera may respectively capture first video content and second video content of an event from different perspectives. Synchronization may refer to a process by which first video content and the second video content are correlated in time with each other such that the event can be synchronously viewed from both perspectives during playback (e.g., stereoscopic display).

The hub 102 may synchronize data from the two or more media sources on site so that the synchronized media content (e.g., synchronized video and audio content) can be streamed or broadcast to the display device 104 or the computer system 112 in real-time (e.g., as it is processed). In some previously-implemented systems, content had to be synchronized in post-processing, e.g., by a computer system 112. By contrast, the hub 102 can synchronize two or more sources of media content so that it is can be immediately streamed or broadcast to other devices over the one or more networks 110 without post-processing the video content and external media source content.

The hub 102 comprises one or more processors 102p communicatively coupled to memory 102m (e.g., read-only memory, random access memory) storing a set of executable instructions 102i that, as a result of execution by the one or more processors 102p, cause the hub 102 to perform operations described herein. The hub 102 also includes one or more communication interfaces 102c communicatively coupled to the one or more processors 102p for communicating with other devices in the environment 100. The one or more communication interfaces 102c may include wired network adapters (e.g., Ethernet network adapter), wireless network adapters (e.g., Wi-Fi network adapter, cellular adapter), or contactless communication devices (e.g., Bluetooth transceiver, ZigBee transceiver, Near-Field Communication transceiver) for communicating with other devices in the environment 100, either directly or via the one or more networks 110.

The camera 108 is a media content source configured to sequentially capture a plurality of images as video, which may be stored as data in memory (e.g., solid state memory) or some other local non-transitory storage medium (e.g., cassette tape). The camera 108 may have a video output port 108v from which a signal is provided corresponding to the video captured—for instance an encoded digital video signal. The video output port 108v may be a High Definition Multimedia Interface (HDMI) port, a Digital Video Interface (DVI) port, a Mini-DVI port, a DisplayPort port, a serial port (e.g., Universal Serial Bus (USB) port), a proprietary port, or other such port for providing a video signal, by way of non-limiting example. The signal provided from the video output port 108v may be generated by transition-minimized differential signaling (TMDS) methods.

The camera 108 may also have an input 108i for receiving media content from an external source 114, such as a microphone, and for receiving video from the camera 108. The input 108i may include one or more ports, such as a video input port (e.g., HDMI port), an audio input port (e.g., audio receptacle), or a general data input port (e.g., USB port). The external source 114 may transmit a signal to the camera 108 via the input 108i that provides audio media content to the camera 108. The input 108i may include a microphone connector, such as a 3.5 mm, 2.5 mm or 14 inch female receptacle that receives a corresponding male connector (e.g., jack, pins) of or connected to the external source 114. In some embodiments, the input 108i may include a serial port or other interface for receiving external media content. The input 108i may be configured to receive an analog signal, configured to receive a digital signal, or both. In some embodiments, the camera 108 may be configured to pass the signal received at the input 108i from the external source 114 through to be provided as an audio signal from the video output port 108v or a separate output port. In some embodiments, the camera 108 may be configured to encode the signal received at the input 108i into the signal provided from the output port 108v.

The transmitter device 106 is configured to receive media content from the camera 108 and transmit the received media content to the hub 102. The transmitter device 106 is electrically communicatively coupled to the camera 108 and configured to receive images and video captured by the camera 108. The transmitter device 106 includes one or more input ports 106i for receiving video from the camera 108 via the video output port 108v. The transmitter device 106 includes one or more processors 106p that cause the transmitter device 106 to perform as described herein. The one or more processors 106p may be configured to process the media content into one or more particular formats, such as MPEG-4 or H.264, appropriate for transmission to the hub 102.

The transmitter device 106 includes a communication interface 106c for wirelessly transmitting media content to the hub 102. The communication interface 106c may include one or more transmitters such as a Bluetooth transmitter, a ZigBee transmitter, a Wi-Fi transmitter, or a cellular transmitter, by way of non-limiting example. The communication interface 106c may transmit media content data to the hub 102 via the network 110 or via direct wireless communication with the communication interface 102c of the hub 102 (e.g., via a Bluetooth connection). The communication interface 106c may also include one or more ports for wired connection, such as an Ethernet port or a serial port (e.g., USB port).

The transmitter device 106 includes memory 106m (e.g., read-only memory, random access memory) for storing media content data. For instance, video received from the camera 108 may be stored as video data in the memory 106m in a buffer managed by the processor 106p. Media content from the external source 114 may be stored in the memory 106m separately from the video data from the camera 108. The processor 106p may cause the communication interface 106c to transmit media content stored on the memory 106m and store media content received from the camera 108 and/or the external media source 114—for instance, the processor 106p may implement a ring buffer in the memory 106m in which media content data is circularly obtained from the memory 106m for transmission and media content data of previously-received media content is overwritten in the memory 106m with more recently received media content data. In some instances, in which the transmitter device 106 is not in communication with the hub 102 (e.g., is out of communication range), the media content data may be persistently stored on the memory 106m until a time at which the transmitter device 106 is in communication with the hub 102. The transmitter device 106 may be selectively physically attachable to the camera 108 for facilitating convenient transportation of both devices.

In some embodiments, the memory 106m may store a set of instructions that, as a result of execution by the one or more processors 106p, cause the one or more processors 106p to perform as described herein. In some embodiments, the one or more processors 106p may include a set of processors having logical circuitry that is hardwired to cause the set of processors to perform as described herein. For example, the set of processors may include a Field Programmable Gate Array (FPGA) device or an Application Specific Integrated Circuit (ASIC) having hardware specifically configured to perform the operations described herein.

In some embodiments, the transmitter device 106 and the camera 108 may be part of the same device. As one example, the transmitter device 106 and the camera 108 may be a smartphone or a tablet computer that captures and transmits video data to the hub 102. In such embodiments, the external media source 114 may be directly communicatively coupled to an input port of the device, such as an audio input port or USB port thereof.

The display device 104 includes a display 104d for displaying images as part of a calibration procedure performed to synchronize media content captured by the external media source 114 with video captured by the camera 108. The display device 104 includes one or more processors 104p communicatively coupled to the display 104p and memory 104m storing a set of instructions 104i that, as a result of execution by the one or more processors 104p, cause the one or more processors 104p to perform operations described herein. The display device 104 may be a laptop computer, a tablet computer, a smartphone, or desktop computer, by way of non-limiting example. The display device 104 may include one or more user input devices (not shown), such as a touchscreen, a mouse, a keyboard, buttons, etc., that the user can interact with to provide input to the display device 104 for controlling its operation. In some embodiments, the display device 104 may include a projector coupled to a computing device (e.g., laptop computer, tablet computer) that projects images onto a surface. In such embodiments, the surface onto which images are projected may be considered as being the display 104d. The set of instructions 104i may be collectively stored as one or more applications or programs configured for performing the calibration procedure, viewing media content broadcast by the hub 102, or communicating with the computing system 112.

In some embodiments, the environment 100 may include a second camera 116 communicatively coupled to a second transmitter 118 for transmitting video content captured by the second camera 116 to the hub 102. The camera 108 may capture first video content and the second camera 116 may capture second video content that overlaps in time, at least in part, with the first video content. The hub 102 may synchronize, e.g., by relating in time, the first video content with the second video content so that a multi-camera perspective of an event can be captured and correlated. One application of such multi-camera capture is stereoscopic imaging for generating three-dimensional video. The second camera 116 and the second transmitter 118 may be substantially similar to the camera 108 and the transmitter device 106, respectively, so further description thereof is omitted.

To synchronize the stream of video from the camera 108 with external media content (e.g., from the external source 114, from the second camera 116), the calibration procedure is performed in which a time delay of one or more devices is determined. The delay may be, for example, a time period between a first time when image light is incident upon the camera 108 and a second time when the transmitter device 106 receives an image generated by the camera 108 corresponding to the image light. The system may also determine a time delay associated with the second camera 116 so that video generated by the camera 108 can be synchronized with video generated by the second camera 116.

Figure 2:
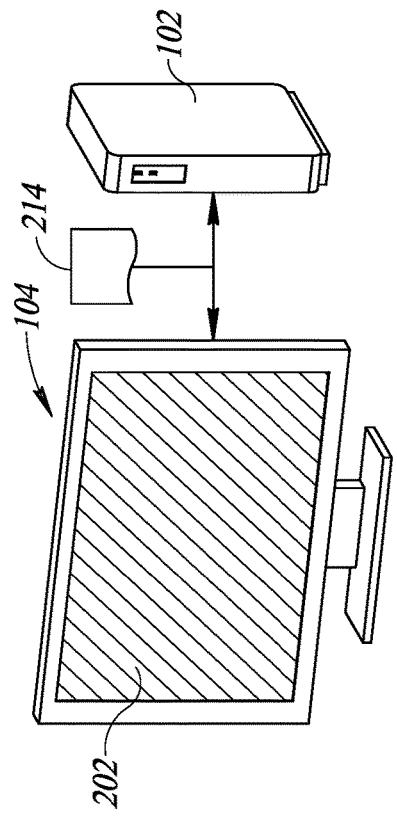
FIG. 2 shows an environment in which a camera associated with the system of FIG. 1 captures display of a first image of a sequence of images.
Figure 2:
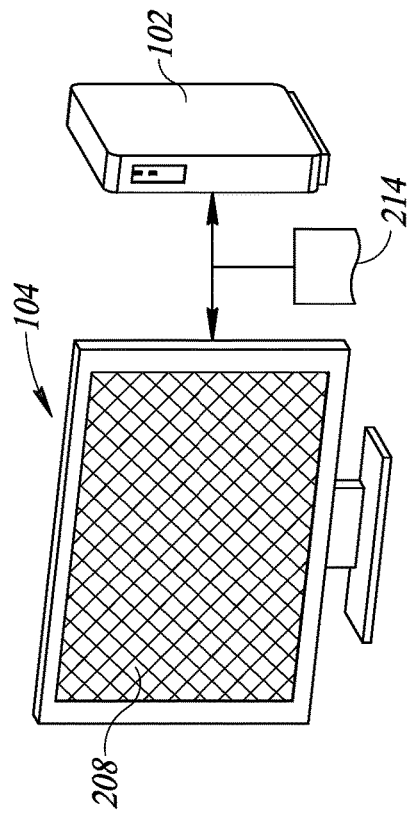

FIG. 2 shows an environment 200 in which a first portion of the calibration procedure is performed. As shown in the environment 200, the camera 108 includes circuitry 108c that generates and/or processes the image data. The circuitry 108c may include one or more imaging sensors, such as complementary metal oxide silicon (CMOS) devices or charge coupled devices (CCDs), that generate image data as a result of light being incident thereon. The circuitry 108c includes analog-to-digital conversion circuitry that converts analog signals generated by the image sensors to digital signals to be outputted from the video output port 108v. The circuitry 108c may include additional signal processing circuits and/or signal conditioning circuitry.

There may be a time delay between a first time at which light is incident upon the imaging sensor of the camera 108 and a second time at which a signal providing video is outputted from the circuitry 108c to the video output port 108v, which may be referred to as a camera delay. The length of the time delay may vary depending upon the make, model, settings, etc. of the camera 108. There may also be an additional delay between the second time at which an image is outputted to the video output port 108v and a time at which circuitry of the transmitter device 106 captures the image, which may be referred to as capture delay of the transmitter device 106. In a multi-source environment such as the environment 100, the time delay (comprising the camera delay and the capture delay) can cause video to be skewed or offset in time relative to media content generated by the media content source 114 and the second camera 116.

Synchronizing different sources to compensate for the camera delay and the capture delay could be accomplished in post-processing using additional software in post-processing, which may require significant production experience to achieve. However, the system described herein facilitates synchronization of multiple media content sources by performing a calibration procedure in which the time delay is determined and the video content generated by the camera 108 can be automatically time-adjusted relative to the media content provided by the external source 114 or the second camera 116. Accordingly, a user presented with video and audio from multiple media content sources does not perceive any skew in time between events captured by different media content sources—for example, video presented on the display 104d depicting a person talking is synchronized with audio of the person talking. Media content from different sources may be considered as being synchronized when the difference between events captured is less than 33 ms, as discussed herein.

Referring to FIG. 2, a user may operate the display device 104 to initiate the calibration procedure. The set of instructions 104i stored in the memory 104m of the display device 104 may be collectively organized as an application, a program, extension, etc., that causes a user interface to be displayed on the display 104d. The user can interact with the input devices of the display device 104 to initiate the calibration procedure via the user interface prior to the time corresponding to the environment 200. The user interface may then provide instructions to the user regarding the calibration procedure, such as instructing the user on how to setup the display device 104 relative to the camera 108. For instance, the user may be instructed to position the display device 104 in front of an aperture of the camera 108 within a distance range and may instruct the user on preferred lighting conditions and orientation of the display 104d relative to the camera 108.

The calibration procedure includes causing the display device 104 to display a sequence of images that include a first image displayed over a first time period and a second image displayed over a second time period after the first time period. The camera 108 captures video of the sequence of images displayed on the display 104d and sends the video to the hub 102. The hub 102 correlates time information provided by the display device 104 and time information provided by the transmitter device 106 to determine the time delay, which includes at least the camera delay associated with the camera 108, and which may include the capture delay. As a result, the time delay can be used to adjust playback of video provided by the camera 108 relative to media content received from external media sources such that a user does not perceive a significant lag or time skew between events in the different media sources.

In the first portion of the calibration procedure shown in the environment 200, the display device 104 displays a first image 202 on the display 104d for a first time period. The camera 108, having its aperture directed at the display 104d, receives image light 204 corresponding to the first image 202 presented at a first time. The circuitry 108c generates and outputs a first captured image 206 at a second time after the first time. The first captured image 206 is representative of the first image 202 presented on the display 104d at the first time and captured as an image by the camera 108. The first captured image 206 is outputted from the video output port 108v to the transmitter device 106. The transmitter device 206 transmits the first captured image 206 to the hub 102.

Figure 3:
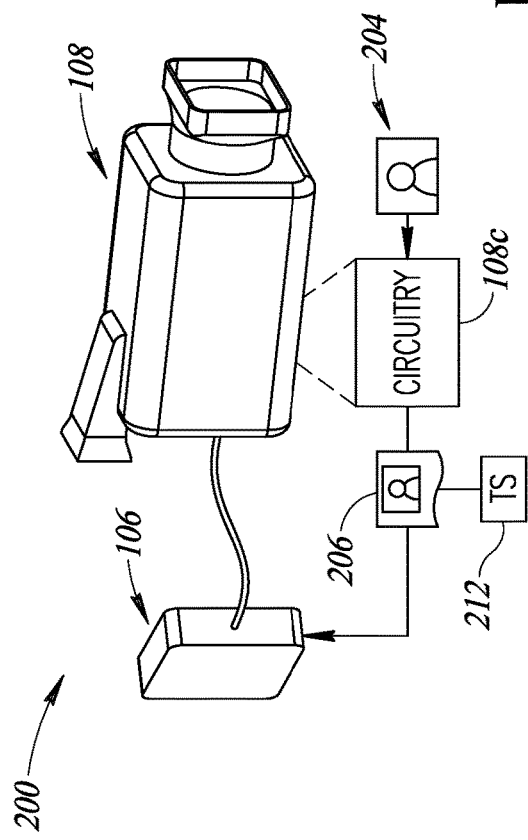
FIG. 3 shows an environment in which the camera captures display of a second image of the sequence of images.
Figure 3:
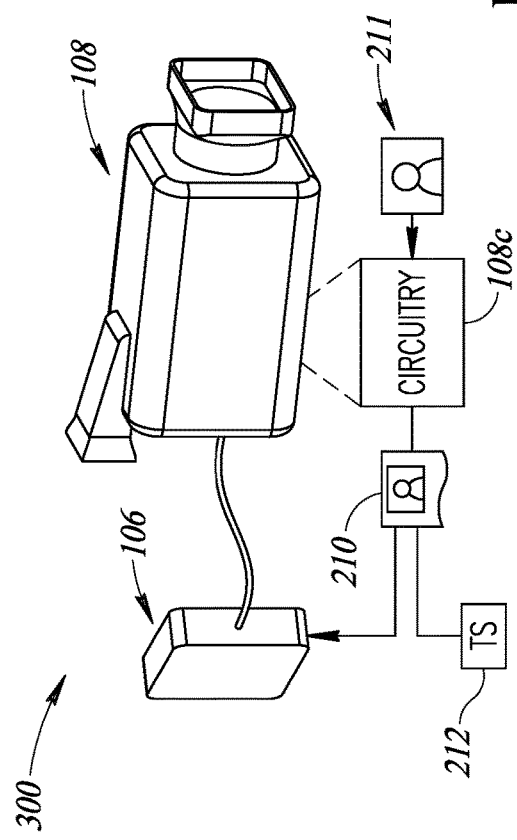

FIG. 3 shows an environment 300 in which a second portion of the calibration procedure is performed. As shown in the environment 300, the display 104d of the display device 104 positioned in view of the aperture of the camera 108 displays a second image 208 at a third time after the first time discussed with respect to the environment 200. The second image 208 is an image different than the first image 202, as discussed in further detail below. The circuitry 108c of the camera 108 generates a second captured image 210 that is representative of second image light 211 corresponding to display of the second image 208 on the display 104d, which is captured as an image by the camera 108. The circuitry 108c outputs the second captured image 210 at a fourth time after the third time. That is, there is a camera time delay between the third time and the fourth time. The second captured image 210 is outputted from the video output port 108v to the transmitter device 106, which transmits the second captured image 210 to the hub 102. There may be an additional time delay—the capture delay discussed above—between a time when an image is outputted from the video output port 108v and a time when the transmitter device 106 captures the outputted image (e.g., timestamps the image).

Each captured image captured by the camera (e.g., first captured image 206, second captured image 210) may have time information 212 associated therewith indicating a time at which the circuitry 108c outputted the first captured image 206. The time information 212 may be, for example, a time stamp including data that indicates a time at which the first captured image 206 was captured, which may have precision down to the millisecond. The time information 212 may be generated by the circuitry 108c or may be generated by the transmitter device 106. In some embodiments, the time information 212 indicates a time at which the camera 108 outputted the image from the circuitry 108c. In some embodiments, the time information 212 indicates a time at which the transmitter device 106 captured the image from the camera 108.

In some embodiments, the hub 102 may correlate the time information 212 with time information provided by the display device 104 and time information associated with the transmitter device 106, e.g., by correlating time information received by each device to a clock for the system. The transmitter device 106 may maintain first clock information associated with system time of the transmitter device 106 and the display device 104 may maintain second clock information associated with system time of the display device 104. The hub 102 may receive, from the transmitter device 106 and the display device 104, the first time information and the second time information, which can be used by the hub 102 to determine system time differences therebetween. In some embodiments, the transmitter device 106 and the display device 104 may be configured to receive a signal from the hub 102 causing both devices to set their system times to a single particular time, e.g., a system time of the hub 102 at the beginning of a calibration procedure. The system time for the devices in the environment 100 (e.g., the hub 102, the display device 104, the transmitter device 106) can therefore be synchronized to a same time with a desired accuracy, such as 10 ms. The system time for the display device 104 may be a time associated with execution of the instructions 104i (e.g., a time specific to the application or calibration procedure), which may not be the same as a clock of the display device 104.

The display device 104 also provides display time information 214 indicating times at which the display device 104 displayed certain images during the calibration procedure. In particular, the display device 104 may provide display time information 214 regarding the third time at which the second image 208 was displayed on the display 104d. In some embodiments, the display time information 214 may include information regarding the first time at which the first image 202 was displayed on the display 104d. The display time information 214 may be sent over the network 110 to the hub 102 during or after the sequence of images is displayed on the display 104d as part of the calibration procedure.

The hub 102 may determine a time delay of the camera 108 based on the time information 212 and the display time information 214. The time delay corresponds to a time period in which the circuitry 108c generates and outputs captured images in response to image light incident upon the imaging sensor of the camera 108.

Figure 4:
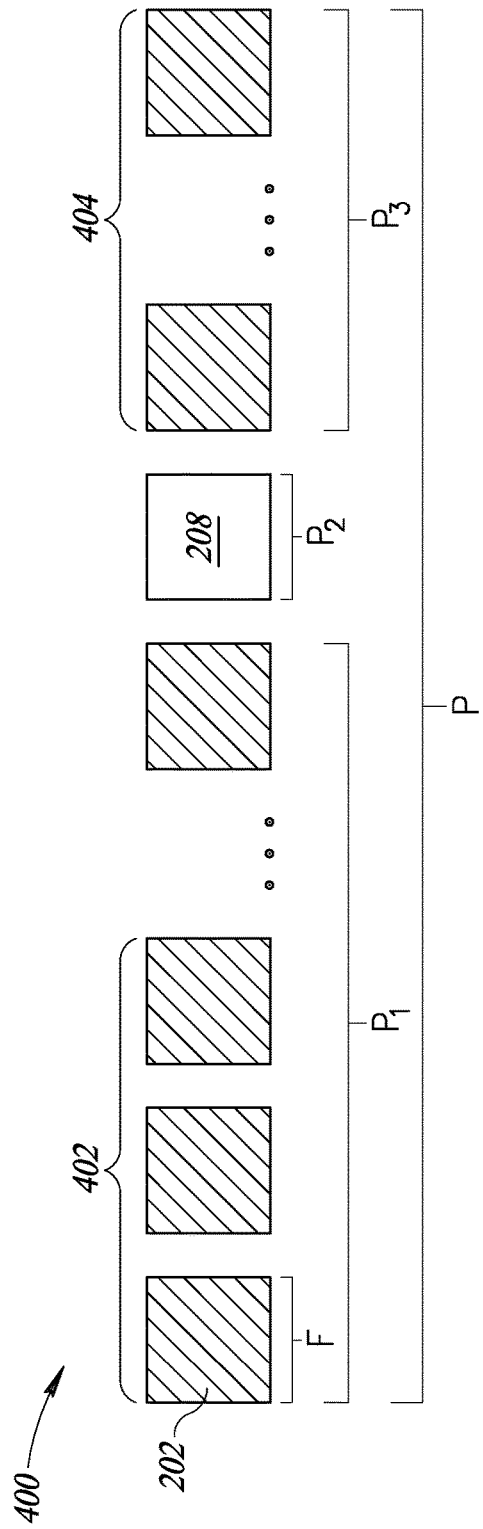
FIG. 4 shows a first sequence of images involved in the calibration procedure of FIG. 1 according to one embodiment.

FIG. 4 shows a sequence of images 400 displayed on the display 104d of the display device 104 as part of the calibration procedure according to one or more embodiments. The sequence of images 400 are displayed according to the set of instructions 104i stored on the memory 104m of the display device 104. The sequence of images 400 is displayed for a time period P, which may be less than one second. For instance, the defined time period P may be 500 milliseconds (ms). The display device 104 may repeatedly display the sequence of images 400 until one or more criterions are satisfied. The one or more criterions may be a number of times that the sequence of images 400 are displayed or a length of time. In some embodiments, the display device 104 may display the sequence of images 400 until the display device 104 receives a signal from the hub 102 to cease display of the sequence of images 400. The frequency at which the sequence of images 400 is repeated is calculated such that the frequency is at least twice the maximum possible delay for the system. For instance, if the maximum time delay is 200 ms, the time period P should be at least 400 ms.

The sequence of images 400 includes a first set 402 of the first images 202 displayed on the display 104d during a first time period P1, which is a period of time smaller than the time period P. In particular, the first image 202 is displayed on the display 104d for the first time period P1. The first time period P1 may correspond to a number of frames F for display on the particular display device 104. The display device 104 may have a frame rate corresponding to a frame of the display device 104—for example, the display device 104 may have a frame rate of 60 Hz in which each frame F is displayed for one sixtieth (1/60) of a second. The display device 104 may determine a number of frames corresponding to the first time period P1 based on the frame rate. The first image 202 is an image having predefined characteristics, such as pattern, color, and/or brightness level. In some embodiments, the first image 202 is a black image having a low brightness value (e.g., 0 brightness, less than 128 brightness). In some embodiments, the first image 202 may have a particular pattern comprising two or more tones, such as a checkerboard, stripes (e.g., vertical, horizontal, or diagonal), or other such uniform pattern.

The sequence of images 400 also includes the second images 208 during a second time period P2, which is a period of time smaller than the first time period P1. In particular, the second image 208 is displayed on the display 104d for the second time period P2. The second image 208 may, for example, be displayed on the display 104d for a single frame. The second time period P2 may be 33 ms, 50 ms, or some other time period sufficient for the imaging sensor of camera 108 to capture display of the second image 208 on the display 104d. The display device 104 may determine a number of frames for which to display the second image 208 that corresponds to the third time period P4. The second image 208 is an image having predefined characteristics different than the first image 202—for example, a checkerboard pattern, stripe pattern, or other uniform pattern than the first image 202. In some embodiments, the second image 208 is a white image comprised of red, green, and blue pixel values having a high brightness level (e.g., 255 brightness).

The sequence of images 400 may include a second set 404 of the first image 202 displayed after the second time period P2. The second set 404 of the first image 202 may be displayed for a third time period P3. In some embodiments, the time period P is equal to a sum of the first time period P1, the second time period P2, and the third time period P3. In some embodiments, the time period P is equal to a sum of the first time period P1 and the second time period P2.

Figure 5:
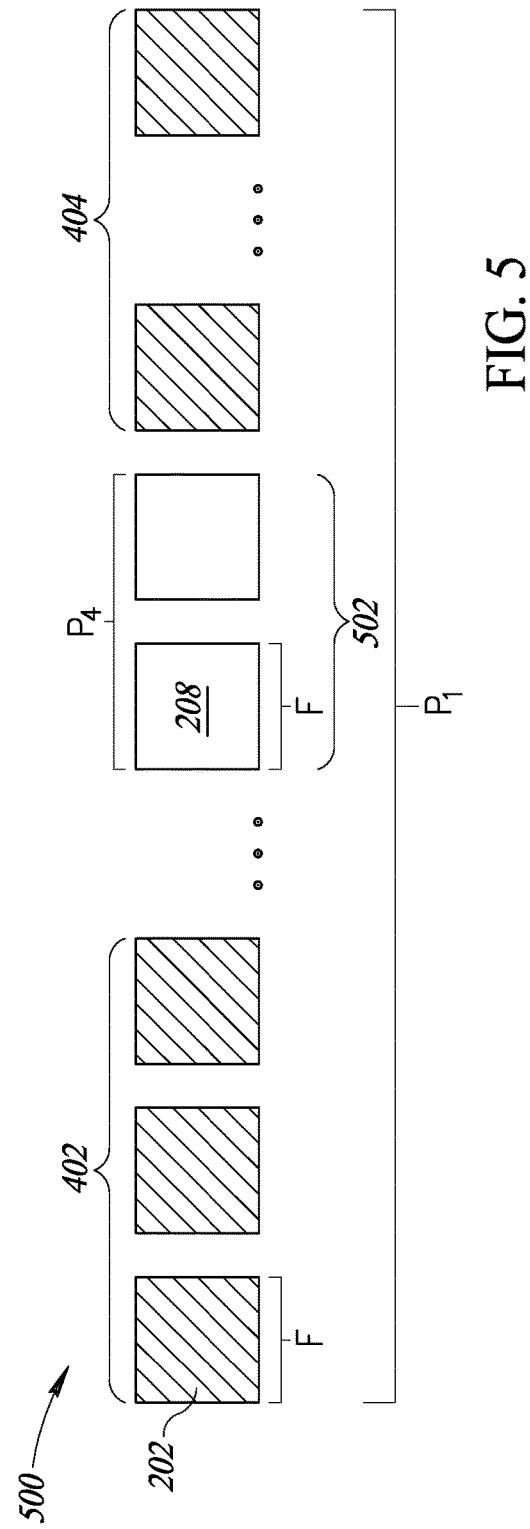
FIG. 5 shows a second sequence of images involved in the calibration procedure of FIG. 1 according to one embodiment.

FIG. 5 shows a sequence of images 500 displayed by the display device 104 as part of the calibration procedure in accordance with one or more embodiments. The sequence of images 500 is substantially similar to the sequence of images 400 with the exception that a second set 502 of the second images 208 is displayed for a plurality of frames F of the display device 104. The second set 502 of the second images 208 may be displayed for a time period P4 that is longer than the second time period P2 discussed with respect to the environment 400. For instance, the second image 208 may be displayed for two frames F or three frames F of the display device 104. Other aspects of the sequence of images 400 are substantially similar to the sequence of images 400 so further description thereof is omitted for brevity.

Displaying the second image 208 for two or more frames F of the display device 104 may facilitate detection of the second image 208 in images captured by the camera 108 due to blurring or aliasing. In situations where the frame rate for image capture by the camera 108 and image display by the display device 104 are the same (e.g., both are 60 Hz), the frames captured by the camera 108 may not sync exactly with the frames displayed by the display device 104. In such situations, displaying the second image 208 for two or more frames F may aid the camera 108 in capturing an image of the second image 208 on the display 104d.

Figure 6:
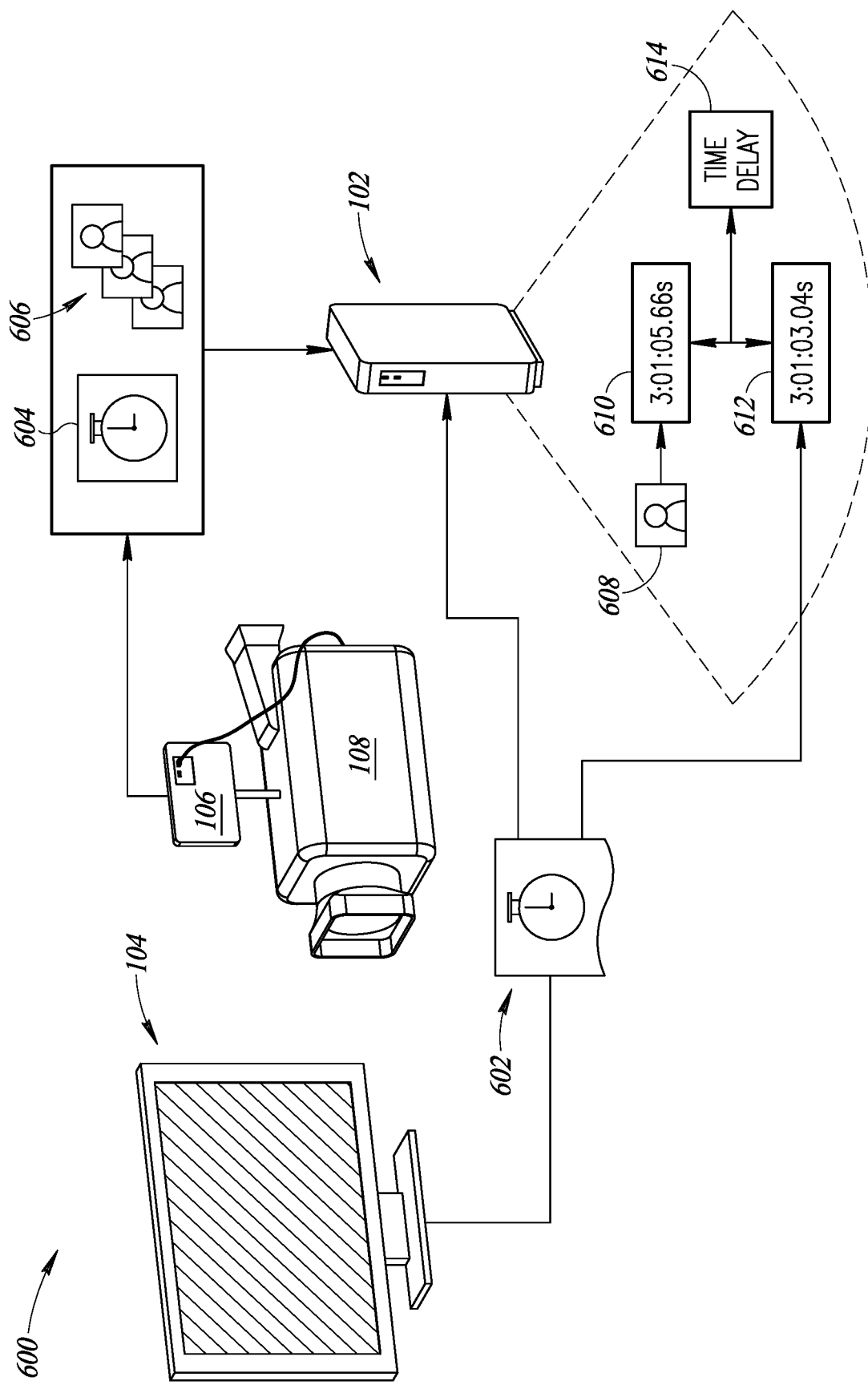
FIG. 6 shows an environment in which a time delay is determined.

FIG. 6 shows an environment 600 in which a part of the calibration procedure is performed according to one or more embodiments. In the environment 600, the hub 102 obtains time information regarding relative display of the second image 208 by the display device 104 and capture of the second image 208 by the camera 108 as displayed by the display device 104. The calibration procedure may be initiated via the user interface on the display device 104, which may cause the display device 104 to provide a notification to the hub 102 indicating initiation of the calibration procedure. In response, the hub 102 may provide a notification to the transmitter device 106 that the calibration procedure has been initiated.

The display device 104 then begins displaying the sequence of images 400 or the sequence of images 500 on the display 104d. The display device 104 may generate display time information 602 indicating a time at which the first set 402 of the first images 202 are displayed, which may include time information specifying a time at which the display device 104 begins to display the first set 402. The display time information 602 may also specify a time at which the second image 208 is displayed. The display time information 602 may relate to a system time associated with the display device 104 having a precision to the millisecond. The display time information 602 may include one or more time stamps respectively corresponding to the display times for the first set 402 of the first image 202, the second image 208 (or the set 502), and the second set 404 of the first image 202.

The camera 108 captures display of the sequence of images 400 or the sequence of images 500 displayed by the display device 104 during the time period P. The camera 108 provides video comprising a sequence of captured images 606 that capture display of the sequence of images 400 or 500. The camera 108 provides video to the transmitter device 106 via the video output port 108v, as described elsewhere herein. The transmitter device 106 also transmits, to the hub 102, capture time information 604 regarding a time associated with each image captured by the camera 108. The capture time information 604 indicates the time at which each captured image was outputted by the circuit 108c. In some embodiments, the capture time information 604 may be generated by the circuitry 108c of the camera 108—for example, the circuitry 108c may generate time stamps for each captured image indicating a time at which the captured image was generated. In some embodiments, the capture time information 604 may be generated by the transmitter device 106. As one example, the transmitter device 106 may generate time information based on time information provided by the camera 108. In some implementations, the transmitter device 106 may generate time information indicating a time at which the transmitter device 206 captures each image. The transmitter device 106 may associate the capture time information with each of the captured images 606 that the transmitter device 106 receives from the camera 108.

The transmitter device 106 also transmits captured images 606 to the hub 102, which collectively comprise video corresponding to the capture of the sequence of images 400 or 500 by the camera 108. The captured images 606 may be in a particular image or video format. The capture time information 604 may be associated with corresponding images of the captured images 606. For instance, each time stamp may be associated as metadata of each image of the captured images 606. In some embodiments, the capture time information 604 may be information separate from the captured images 606 but that includes information indicating which of the captured images 606 each instance of time information (e.g., timestamp) is associated with.

The hub 102 receives the display time information 602 provided by the display device 104 and receives the capture time information 604 provided by the transmitter device 106. The hub 102 processes the display time information 602 and the capture time information 604 to determine a time delay associated with the camera 108. For example, the hub 102 determines a first time at which the display device 104 displayed the second image 208 and a second time at which the camera 108 outputted (or the transmitter device 106 captured) an image corresponding to the second image 208. The hub 102 determines the time delay based on a difference between the first time and the second time. For instance, the time delay may be equal to the first time subtracted from the second time. The time delay may be used to synchronize video generated by the camera 108 with media content generated by external media sources, such as the external source 114 or the second camera 116.

To process the display time information 602 provided by the display device 104, the hub 102 may identify a timestamp in the display time information 602 that corresponds to display of the second image 208. The set of instructions 104i may cause the display device 104 to particularly specify the time at which the second image 208 was displayed on the display 104d. The display time information 602 may have an identifier, such as a variable name or a flag, that identifies a particular instance of data as being the timestamp associated with display of the second image 208.

The hub 102 may process the captured images 606 to determine an image therein corresponding to the second image 208. In particular, the hub 102 may process each of the captured images 606 and determine which, if any, of the captured images 606 corresponds the second image 208. To identify the corresponding image(s) of the captured images 606, the hub 102 may calculate a value that is representative of each image and compare the representative value with a corresponding threshold value or range of values that correspond to the second image 208. One or more target images 608 of the captured images 606 may be identified by the hub 102 as corresponding to display of the second image 208 as a result of determining that the representative value satisfies a condition involving the threshold value or range of values—for example, that the representative value exceeds the threshold value or is within a range of values.

After determining the one or more target images 608, the hub 102 may then identify target time information 610 corresponding to a time associated with the target image 608, such a timestamp indicating a time at which the target image 608 was received by the transmitter 106 or outputted by the camera 108. Using the target time information 610 and the display time information 602, the hub 102 may determine a time delay 614 associated with the camera 108 and the transmitter 106. The hub 102 may identify a display time 612 of the second image 208 based on the display time information 602 provided by the display device 104. The hub 102 may determine the time delay 614 based on a difference between the display time 612 and the target time information 610.

As a particular example, an application on the display device 104, in connection with a calibration procedure, causes the first images 202 to be displayed on the display 104d for the first time period P1. In this particular example, the first time period P1 may be 991.66 ms, which is a time period in which 119 frames are displayed on a display device having a 120 Hz frame rate. In response to expiration of the first time period P1, the display device 104 may display the second image 208 for the second time period P2, which may be a duration of a single frame F—a timer period of 8.33 ms for a 120 Hz frame rate display device. The display device 104 may generate and transmit to the hub 102 display time information 602 indicating a time at which the first time period P1 began (e.g., system time 0 ms) and a time at which the second time period P2 began (e.g., system time 992 ms).

Contemporaneously, the transmitter device 106 may generate capture time information 604 indicating a time when each of the captured images 606 was captured by the transmitter device 106. The hub 102 may determine that the target image 608 (the image in the captured images 606 capturing display of the second image 208) was captured at a system time of 1192 ms based on the capture time information 604. The hub 102 may therefore determine that the time delay 614 associated with the camera delay of camera 108 and the capture delay of the transmitter device 106 is 200 ms. The hub 102 may use the time delay 614 to synchronize video transmitted by the transmitter device 106 coupled to the camera 108 with media content from other media sources in the environment 100, such as the external source 114 or the second camera 116. In some embodiments, the capture time information 104 may include timestamps generated by the camera 108, which may be used in the calibration procedure. Synchronizing may include adjusting a playback time of the captured images 606 by 200 ms relative to a playback time of audio content captured for a time period including the time period P.

Figure 7:
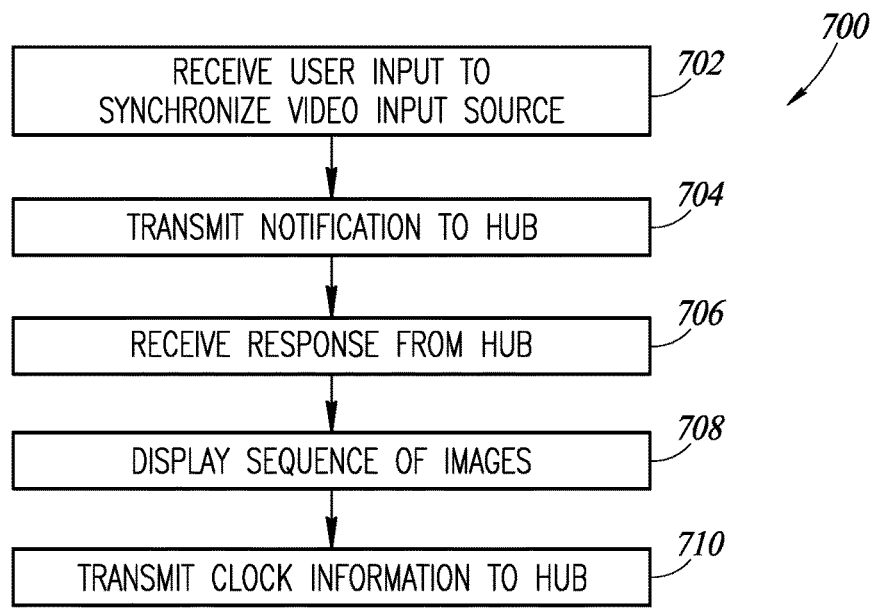
FIG. 7 shows a method performed by a display device in the environment of FIG. 1 as part of the calibration procedure according to one or more embodiments.

FIG. 7 shows a method 700 of initiating a calibration procedure according to one or more embodiments. The method 700 may be performed by the display device 104 in some embodiments; however, the calibration procedure may be initiated by a different device in some embodiments, such as the transmitter 106 or via a computing device other than the display device 104. The method 700 includes receiving 702 user input via the user interface provided on the display device 104. The user input may be an interaction with a button displayed on the user interface presented as a result of execution of the set of instructions 104i by the one or more processors 104p. The method 700 may include transmitting 704, over the network 110, a notification to the hub 102. The notification may include information indicating that the calibration procedure is to be performed. The method 700 may include receiving 706, over the network 110, a response from the hub 102 indicating that the display device 104 is authorized to proceed with display of the sequence of images 400 or 500. Transmitting 704 and receiving 706 may be omitted from the method 700 in some implementations.

The method 700 proceeds by displaying 708, on the display 104d, the sequence of images 400 or 500. Before displaying 708 the sequence of images 400 or 500, the display device 104 may wait to receive further user input indicating that the user is ready for the display device 104 to begin displaying 708 the sequence of images 400 or 500. The display device 104, in some embodiments, displays 708 the sequence of images 400 or 500 until one or more criterions are satisfied. The criterion may be display for a certain period of time, display of a number of the sequence of images 400 or 500, until the hub 102 provides an instruction to stop, or until further user input is received.

Next, the method 700 involves transmitting 710 the display time information 602 to the hub 102 indicating one or more times at which the display device 104 displayed the second image 208. The display time information 602 may include additional time information, such as time information indicating times corresponding to the beginning of each time period P. The display device 104 may perform other operations in connection with or as part of the calibration procedure.

Figure 8:
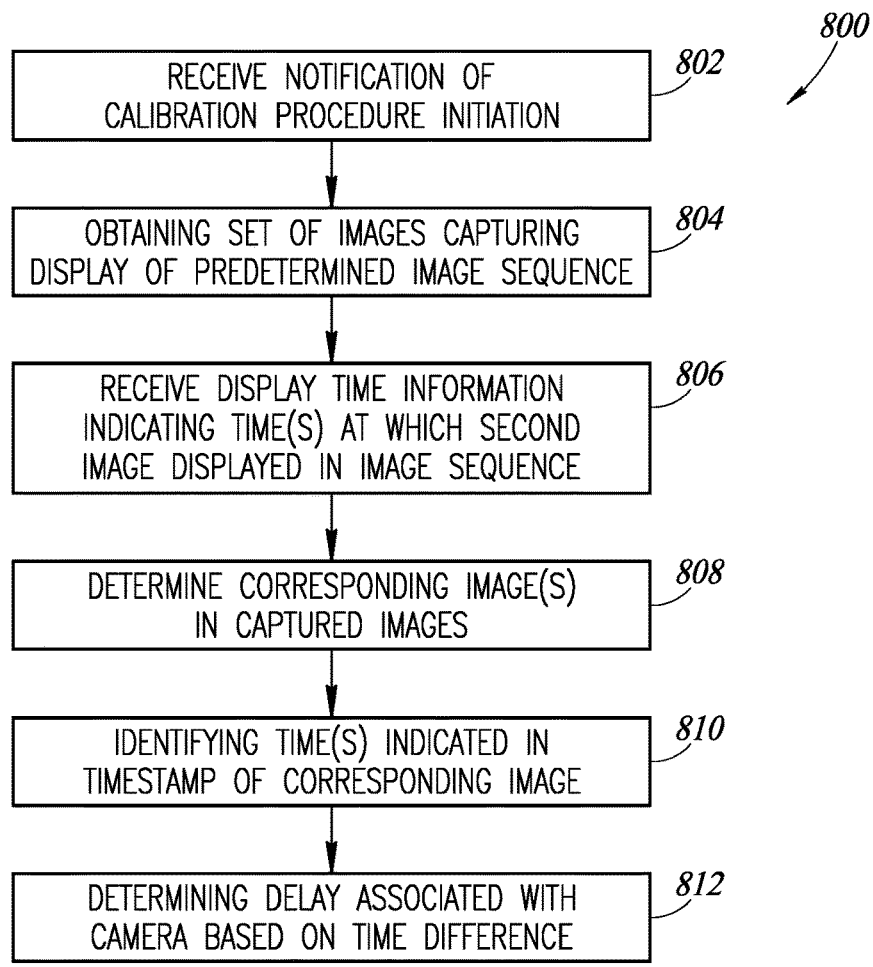
FIG. 8 shows a method performed by a hub device in the environment of FIG. 1 as part of the calibration procedure according to one or more embodiments.

FIG. 8 shows a method 800 performed as part of the calibration procedure according to one or more embodiments. The method 800 may be performed by the hub 102 and in connection with communication with other devices in the environment 100. The method 800 may include receiving 802 a signal from the display device 104 indicating that the calibration procedure has been initiated. Receiving 802 the signal may be as a result of transmitting 704 the signal by the display device 104 discussed above with respect to the method 700 and elsewhere herein.

The method 800 also includes receiving 804 a set of images capturing display of the sequence of images 400 or 500 by the display device 104. In particular, the hub 102 receives 804 the captured images 606 from the transmitter device 106. The hub 102 may receive 804 the captured images 606 sequentially, in groups, or collectively all at once. Receiving 804 the set of images may also include receiving the capture time information 604 indicating times at which each of the captured images 606 was provided by the camera 108. The capture time information 604 may be part of the captured images 606 (e.g., metadata) or may be separate information. The captured images 606 and/or the capture time information 604 may be received by the hub 102 in response to a request to the transmitter device 106 by the hub 102 or automatically as a part of the calibration procedure.

The method 800 further involves receiving 806 the display time information 602 indicating one or more times at which the second image 208 was displayed in the image sequence 400 or image sequence 500 by the display device 104. The display time information 602 may be received in 806 collectively at the same time (e.g., as a single collection of data) or may be a plurality of instances of data (e.g., as multiple files) received over time. Receiving 806 may occur before, after, or concurrently with receiving in 804. The display time information 602 may be received by the hub 102 in response to a request to the display device 104 by the hub 102 or automatically as a part of the calibration procedure. In connection with, or as a result of, receiving 806 the display time information 602, the hub 102 may identify one or more first times in the display time information 602 at which the display device 104 displayed the second image 208. For instance, by identifying timestamps in the display time information 602 that correspond to display times of the second image 208.

The method 800 also includes determining 808 one or more target images 608 in the captured images 606 that correspond to capture of the second image 208 displayed as part of the image sequence 400 or the image sequence 500 by the display device 104, as described below with respect to FIG. 9 and elsewhere herein. Then, the method 800 involves identifying 810 one or more second times in the capture time information 604 corresponding to the image in the captured images 606 determined in 808. For instance, the hub 102 may identify a timestamp associated with each image in the captured images 606 depicting the display of the second image 208 by the display device 104 in 708 of the method 700.

At 812, the method 800 includes determining a time delay associated with the camera 108 based on a time difference between the first time and the second time. In particular, the time difference is a difference between first times at which the display device 108 displayed the second image 208 and second times at which the camera 108 outputted a captured image depicting display of the second image 208. As discussed herein, the time delay includes a time period that it takes for the circuitry 108c of the camera 108 to generate a captured image—for instance, a time period between when image light is incident upon the imaging sensor of the camera 108 and when the circuitry 108c outputs a captured image corresponding to the image light. The time delay may also include a capture time period between a time at which an image is outputted from the circuitry 108c to a time at which the image is captured by the transmitter 106. The hub 102 (or other device in the environment 100) may use the time delay of the camera 108 to synchronize video content received therefrom with other media sources in the environment 100.

Figure 9:
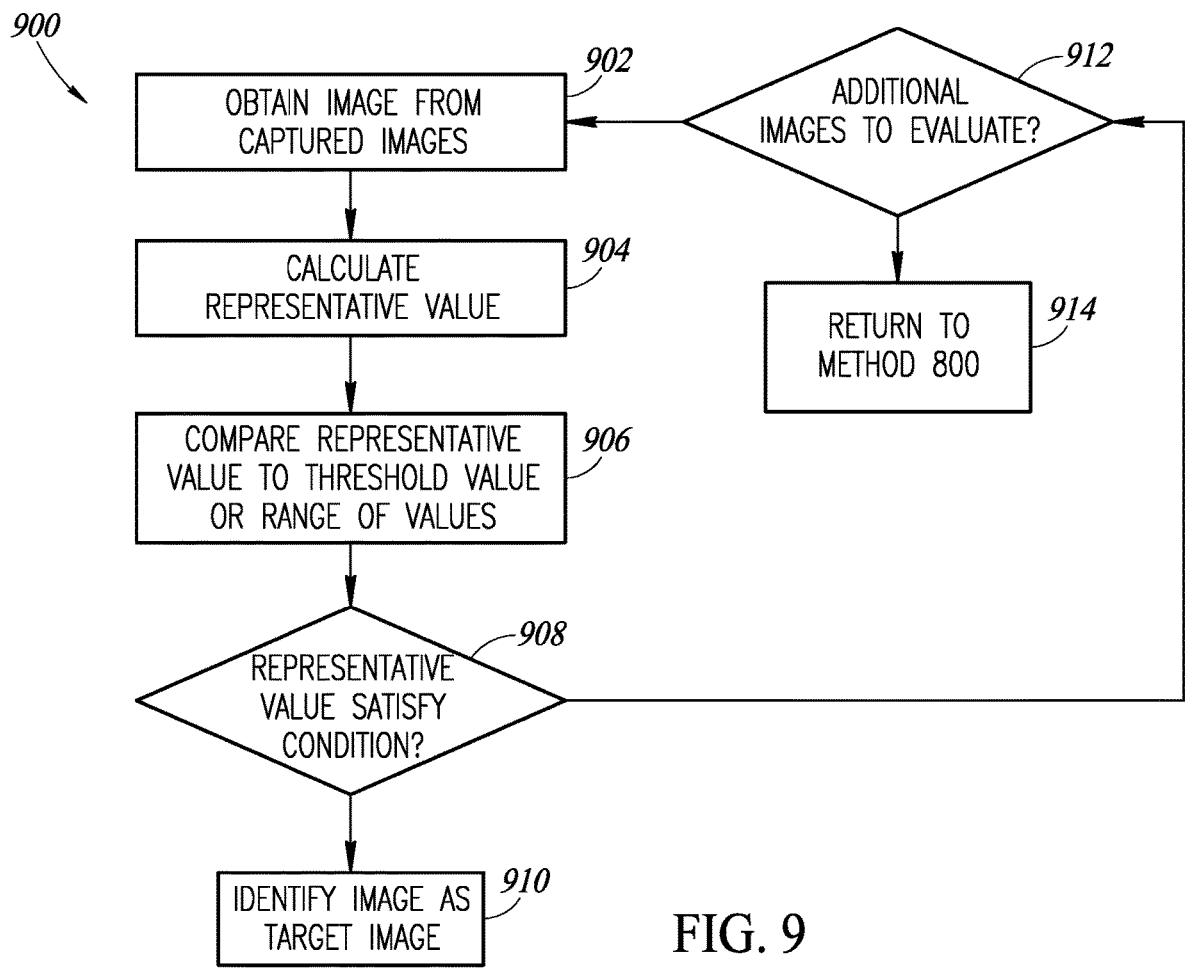
FIG. 9 shows a method for evaluating images of a sequence of images captured by a camera in the environment of FIG. 1.

FIG. 9 shows a method 900 for processing the captured images 606 to identify which, if any, images thereof capture display of the second image 208 displayed by the display device 104 in 708 of the method 700. The method 900 is performed in connection with or as part of determining 808 the corresponding image(s) in the captured images 606 of the method 800. The method 900 may be performed by any appropriate device in the environment 100, such as the hub 102, the transmitter 106, or the computer system 112. The method 900 includes obtaining 902 an image from the captured images 606 for analysis. The image may be the next sequential image in the captured images 606, such as the image having the earliest timestamp associated therewith.

Next, the method 900 includes calculating 904 a representative value for the current image obtained in 902. Calculating 904 the representative value may include calculating an average value of the current image obtained in 902. For instance, values for a set of pixels in the current image may be aggregated and divided by the number of pixels in the set of pixels to determine an average value. The set of pixels may be all of the pixels in the current image or a proper subset thereof—for instance, every other pixel or every third pixel, which may reduce processing overhead.

The average value may be a mean value in some embodiments. In some embodiments, the representative value may correspond to a brightness of the image, a color of the image, a pattern of the image, or combinations thereof. In some embodiments, the average value may be calculated based on a plurality of images, such as a representative value of a current image and a representative value of a successive image in the captured images 606.

It may be beneficial to select the first image 202 and the second image 208 such that the respective representative values of each are substantially different—for instance, that the representative values vary by an amount that can be detected in various lighting conditions. In situations where light incident upon the display 104d may cause reflections that may make it difficult for the camera 108 to detect differences between certain images, it may be beneficial to select a black or dark image (e.g., brightness less than 128, brightness value of zero) as the first image 202 and a white or bright image (e.g., brightness value greater than 255, brightness value of 255) as the second image 208. In some situations, it may be preferable to select a blue image as the second image 208 or an image having a distinct pattern as the second image 208. The set of instructions 104i on the display device 104 may include various configurations for the first image 202 and/or the second image 208 depending on the lighting conditions, the type of camera used, etc., to increase the likelihood that the representative value for the second image 208 will be distinguishable from the representative value of the first image 202.

In 906, the method 900 includes comparing the representative value determined in 904 to a threshold value or range of values. The hub 102 (or other device) determines whether the current image being analyzed corresponds to display of the first image 202 or display of the second image 208 based on the representative value relative to the threshold value or the range of values. For instance, it may be determined that the current image corresponds to a captured second image 208 if the representative value exceeds a certain threshold value or is within a range of values. The threshold value may be a value equal to a midway point between a value of the first image 202 and a value of the second image 208. If the first image 202 is a black image (e.g., 0 brightness value) and the second image 208 is a white image (e.g., 255 brightness value), for example, the threshold value may be 128 in brightness value. Therefore, the hub 102 may determine that the current image corresponds to display of the second image 208 based on the brightness of the current image exceeding the threshold value. Ranges of values may also be implemented based on color, pattern, etc. More than one threshold value may be implemented in some embodiments—for example, a brightness threshold and a color threshold may be implemented to determine if the current image is capturing a reflection that is not representative of the image actually being displayed.

If, in 908, it is determined that the representative value satisfies a condition associated with display of the second image 208 (e.g., exceeds the threshold value, is within a range of values), the method 900 proceeds to identifying 910 the current image as corresponding to the second image 208. Therefore, in 810 of the method 800, the hub 102 will identify 810 time information (e.g., a timestamp) associated with the current image as part of determining the time delay. On the other hand, if the representative value of the current image does not satisfy the condition associated with display of the second image 208 in 908, the method 900 proceeds to determining 912 whether there are additional images to evaluate in the captured images 606. If so, the method 900 returns to obtaining 902 the next image from the captured images 606. If not, the method 900 returns 914 back to the method 800 to identify times of the images detected as corresponding to displayed second images 208.

Figure 10:
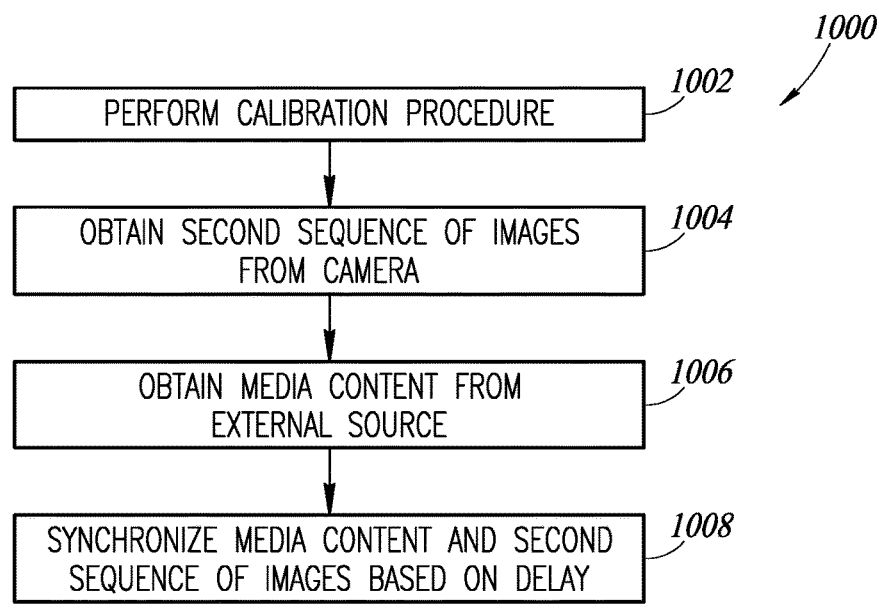
FIG. 10 shows a method for synchronizing video content and media content from an external source as a result of the calibration procedure.

Based on the time delay determined in 812 of the method 800, the hub 102 may synchronize video obtained from the camera 108 with one or more external sources of media content. FIG. 10 shows a method 1000 for synchronizing video content from the camera 108 with media content from external sources according to one or more embodiments. The method 1000 may be collectively performed by one or more appropriate devices in the environment 100, such as the hub 102, the display device 104, and the transmitter device 106. The method 1000 includes performing 1002 a calibration procedure. The calibration procedure may be performed 1002 as described elsewhere herein.

In some embodiments, performing 1002 may include detecting whether the camera 108 communicatively coupled to the transmitter device 106 is a device for which a calibration procedure was already performed. For instance, the transmitter device 106 may detect whether the camera 108 has characteristics corresponding to a make, model, type, etc., of camera for which a time delay has already been determined. Impedance characteristics of the video output port 108v or metadata of video provided by the camera may be analyzed to determine whether the camera 108 connected is a recognized camera 108 for which a calibration procedure was previously performed. In some embodiments, time delays for various cameras may be stored (e.g., in the memory 102m, in the memory 104m, in the computer system 112) and accessed in response to user input via the user interface of the display device 104. A user may provide input that a certain camera is coupled to the transmitter device 106 and the hub 102 may determine corresponding time delay for the camera 108. In such instances, the time delay for the camera may be obtained from memory and performance of the calibration procedure according to the method 800 may be omitted.

Next, in 1004, the method 1000 includes obtaining a second sequence of images from the camera 108. The second sequence of images may be obtained by the transmitter device 106 and transmitted to the hub 102 as part of filming of a scene. The method 1000 also includes obtaining 1006 media content from one or more external sources during the time period P, such as audio content captured by the external source 114 (e.g., microphone) connected to the camera 108 or the transmitter device 106, or video content from the second camera 116. The media content may be obtained 1006 concurrently with the second sequence of images obtained in 1004. The media content may be transmitted to the hub 102 for processing along with the second sequence of images.

The method 1000 then proceeds to synchronizing 1008 the media content and the second sequence of images obtained in 1006 and 1004, respectively. In particular, a playback time of the second sequence of images may be offset relative to a playback time of the media content obtained from the external source 114 or the second camera 116 based on the time delay determined in 812. Therefore, when presented to a user, the second sequence of images and the media content are synchronized in time such that the user perceives no delay therebetween. The media content and the video content may be considered as being synchronized as a result of the delay therebetween being 33 ms or less. In connection with synchronization in 1008, video synchronized with external media content may be broadcast, e.g., by the hub 102, to one or more other devices, such as a display device 104 or computer system 112.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
obtaining a plurality of captured images, produced by a camera, that capture images displayed by a display device including at least a first display image and a second display image;
obtaining, from the display device and independent from content of the second display image, a first time associated with the second display image, based on a system time associated with the display device;
identifying, from the plurality of captured images, a target captured image that captures the second display image displayed by the display device;
obtaining a second time associated with the target captured image; and
determining a time delay associated with the camera based on the first time and the second time.

2. The method of claim 1, further comprising synchronizing media content from the camera with media content from one or more sources external to the camera, based on the time delay.

3. The method of claim 2, wherein the synchronizing comprises adjusting playback of the media content from the camera relative to the media content from the one or more sources external to the camera, based on the time delay.

4. The method of claim 2, wherein the camera is a first camera and the one or more sources includes a second camera.

5. The method of claim 4, further comprising determining a time delay associated with the second camera based on images displayed by the display device and captured images produced by the second camera.

6. The method of claim 1, comprising:
for the plurality of captured images,
calculating a representative value of each captured image; and
comparing the representative value to a threshold value, wherein the target captured image in the plurality of captured images is determined as a result of the representative value associated with the target captured image satisfying a condition involving the threshold value.

7. The method of claim 1, wherein the first display image has a first brightness value and the second display image has a second brightness value different than the first brightness value.

8. The method of claim 1, wherein the plurality of captured images includes a plurality of candidate images that capture the second display image consecutively displayed two or more frames by the display device.

9. A system, comprising:
a communication interface;
one or more processors; and
memory storing a set of instructions that, as a result of execution by the one or more processors, cause the system to perform actions comprising:
identifying a captured image, produced by a camera, that captures a target image displayed by a display device;
obtaining, from the display device and independent from content of the target image, a first time associated with the target image, based on a system time associated with the display device;
obtaining a second time associated with the captured image; and
determining a time delay associated with the camera based on the first time and the second time.

10. The system of claim 9, wherein the actions further comprise receiving, via the communication interface, an indication that the display device will display at least the target image in connection with a calibration procedure.

11. The system of claim 9, wherein the time delay is determined based on a difference between the first time and the second time.

12. The system of claim 9, further comprising:
a transmitter device having a media input port, wherein the captured image is provided in a transition-minimized differential signaling encoded signal received via the media input port.

13. The system of claim 12, wherein the transmitter device transmits the captured image to the communication interface, and the time delay includes a capture delay between a time at which circuitry of the camera outputs an image and a time at which the transmitter device captures the image outputted from the camera.

14. The system of claim 9, wherein the actions further comprise causing synchronizing of media content from the camera with media content from one or more sources external to the camera, based on the time delay.

15. The system of claim 14, wherein the synchronizing comprises adjusting playback of the media content from the camera relative to the media content from the one or more sources external to the camera, based on the time delay.

16. A non-transitory computer-readable medium having a set of instructions stored thereon that, as a result of execution, cause one or more processors to perform actions comprising:
identifying a captured image, produced by a camera, that captures a target image displayed by a display device;
obtaining, from the display device and independent from content of the target image, a first time associated with the target image, based on a system time associated with the display device;
obtaining a second time associated with the captured image; and
determining a time delay associated with the camera based on the first time and the second time.

17. The non-transitory computer-readable medium of claim 16, wherein determining the time delay comprises determining a difference between the first time and the second time.

18. The non-transitory computer-readable medium of claim 16, wherein the actions further comprise causing synchronizing of media content from the camera with media content from one or more sources external to the camera, based on the time delay.

19. The non-transitory computer-readable medium of claim 18, wherein the camera is a first camera and the one or more sources includes a second camera.

20. The non-transitory computer-readable medium of claim 19, wherein the actions further comprise determining a time delay associated with the second camera based on an image displayed by the display device and a captured image produced by the second camera.

* * * * *

UNITED STATES PATENT AND TRADEMARK OFFICE
CERTIFICATE OF CORRECTION

| | |
|---|---|
| PATENT NO. | : 11,606,480 B2 |
| APPLICATION NO. | : 17/314920 |
| DATED | : March 14, 2023 |
| INVENTOR(S) | : Boggavarapu et al. |

It is certified that error appears in the above-identified patent and that said Letters Patent is hereby corrected as shown below:

On the Title Page

Item (72) Inventors:
"Dalimba Laxminarayana, Bangalore (IN)"
Should read: -- Laxminarayana Dalimba, Bangalore (IN) --
AND
"Rao Venkata Krishna Suryanarayana, Bangalore (IN)"
Should read: -- Narayana Rao, Bangalore (IN) --

Signed and Sealed this
Twelfth Day of September, 2023

Katherine Kelly Vidal
*Director of the United States Patent and Trademark Office*